United States Patent [19]

Torrington

[11] 4,205,853
[45] Jun. 3, 1980

[54] RECORD SIDE IDENTIFICATION APPARATUS FOR VIDEO DISC PLAYER

[75] Inventor: Leslie A. Torrington, Indianapolis, Ind.

[73] Assignee: RCA Corporation, New York, N.Y.

[21] Appl. No.: 964,528

[22] Filed: Nov. 29, 1978

[51] Int. Cl.$^2$ .............................................. G11B 17/04
[52] U.S. Cl. ................................... 274/9 B; 206/444; 206/309; 312/223; 340/686
[58] Field of Search ........................ 206/444, 312, 309; 312/223, 10; 274/1 R, 1 B, 9 R, 9 B; 358/128; 360/97, 133, 86; 340/686

[56] References Cited

U.S. PATENT DOCUMENTS

| | | | |
|---|---|---|---|
| 3,439,919 | 4/1969 | Laa | 360/96.6 |
| 3,947,883 | 3/1976 | Suzuki | 360/96.5 |
| 3,951,264 | 4/1976 | Heidecker et al. | 206/444 |
| 4,138,703 | 2/1979 | Stave et al. | 360/133 |
| 4,145,726 | 3/1979 | Conaty | 360/97 |

FOREIGN PATENT DOCUMENTS

2430377  1/1976  Fed. Rep. of Germany .......... 274/1 R

*Primary Examiner*—John W. Shepperd
*Attorney, Agent, or Firm*—Eugene M. Whitacre; Joseph S. Tripoli; Dilip A. Kulkarni

[57] ABSTRACT

A record is removably subject to occupancy of a protective caddy comprising a jacket and a record retaining spine. The record is enclosed in the caddy such that a first side of the record is associated with a given side of the spine. To load a record into a player, such as a video disc player, an occupied caddy is inserted into an input slot provided in the player. A record extracting mechanism mounted in the player removes the retaining spine and the associated record from the jacket during jacket withdrawal subsequent to the occupied cover arrival at a fully inserted position in the player, whereby the record and the spine are retained within the player. A sensing member mounted in the player in the vicinity of the input slot is deflected in a first direction in response to engagement with an occupied cover during insertion thereof into the player with the given side of the spine facing upward, and is deflected in a second direction, opposite to the first direction, in response to an occupied cover insertion with the given side of the spine facing downward. An indicator responsive to the location of the sensing member and mounted on the front instrument panel of the player provides an indication of the record side subject to playback. An actuating member, subject to engagement with the spine upon occupied cover arrival at the fully inserted position in the player locks the sensing member in the position to which it was deflected during the occupied cover insertion, throughout the period of retention of the spine in the player.

5 Claims, 7 Drawing Figures

RECORD SIDE IDENTIFICATION APPARATUS FOR VIDEO DISC PLAYER

This invention generally relates to video disc players, and more particularly, to players suitable for use with a record bearing caddy.

In certain video disc systems, information is stored on a disc record in the form of geometric variations in the bottom of a continuous spiral groove disposed on the record surface. The variations in capacitance between an electrode incorporated in a groove-riding stylus and a conductive coating disposed on the record surface are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The player is provided with rails for guiding a carriage, having a compartment for receiving the pickup cartridge, along a path. The carriage is driven during playback along the carriage guiding rails in correlation with the motion of the groove-riding stylus. U.S. Pat. No. 3,870,320 (Torrington), discloses a type of carriage translating system.

It is beneficial to enclose a record in a thin plastic caddy comprising a jacket and a record retaining spine. For record loading, an occupied caddy is inserted into an input slot provided in the player. The player is equipped with another set of rails for guiding caddy insertion along a further path. A record extracting mechanism disposed in the player removes the retaining spine and the associated record (hereinafter "record assembly") from the jacket during subsequent jacket withdrawal, whereby the record assembly is retained in the player. The player is equipped with a platform for supporting the retained record assembly, when it is disposed in an elevated position. The retained record is transferred to the turntable for playback during motion of the platform to a depressed position. For subsequent record retrieval, the platform, with the retained record assembly resting thereon, is raised, and an empty jacket is inserted into the player, thereby returning the record assembly back into the jacket. Withdrawal of the caddy, effects record removal from the player. U.S. patent application, Ser. No. 801,604 (Torrington), illustrates a system suitable for use with such a record caddy. The Torrington application, now U.S. Pat. No. 4,133,540 is assigned of record to the assignee of the instant application.

In such players, it is desirable that the player be provided with means for identifying the record side subject to playback. An apparatus, pursuant to the invention disclosed in a concurrently-filed copending U.S. patent application, Ser. No. 964,532 of F. R. Stave, entitled "VIDEO DISC PLAYER HAVING RECORD SIDE IDENTIFICATION APPARATUS", includes a switch which is conditioned in a first state and a second state in response to insertion of the caddy with a given side thereof facing upward and downward respectively. An indicator, responsive to the state of the switch, indicates the record side subject to playback. The apparatus described in the Stave application provides an indication of the record side subject to playback upon arrival of the caddy at a fully inserted position in the player. If the user wants to play the other side of the record, the whole sequence of insertion and withdrawal must be repeated. It is advantageous for the user to have an indication of the record side presented for playback as soon as the caddy is inserted into the player, for example, for loading a record therein.

An apparatus, in accordance with the instant invention, includes a sensing member mounted in the player in the immediate vicinity of the input slot such that it is subject to deflection in a first direction when an occupied caddy is inserted into the player with a given side thereof facing upward, and is subject to deflection in a second direction, opposite to the first direction, in response to an occupied cover insertion with the given side thereof facing downward. Means, responsive to the direction of deflection of the sensing member, provide an indication of the record side subject to playback. Actuating means, subject to engagement with the spine upon cover arrival at the fully inserted position in the player, hold the sensing member in the location to which it was deflected during the cover insertion, throughout the period of retention of the spine in the player.

Figure 1:
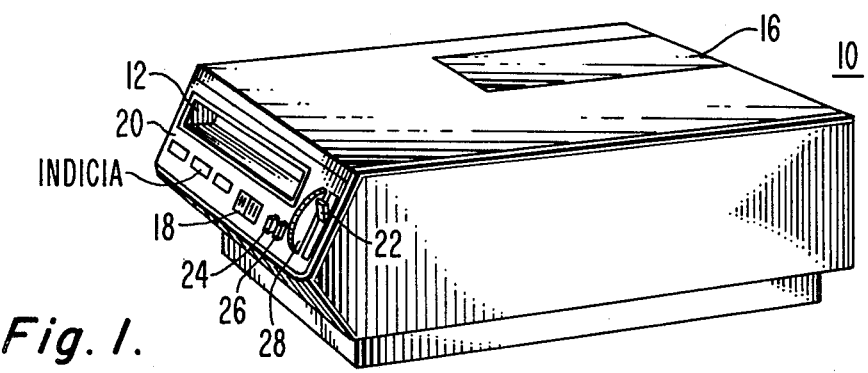
FIG. 1 illustrates a video disc player incorporating a record side identification apparatus pursuant to the principles of the present invention.
Figure 2:
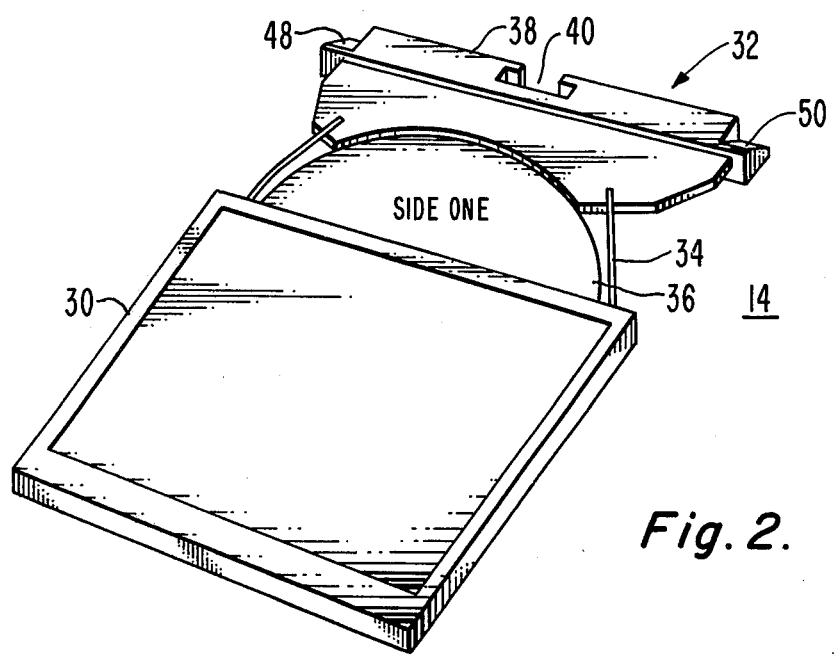
FIG. 2 shows a record caddy suitable for use with the player of FIG. 1.

As shown in FIG. 1, a video disc player 10, incorporating the record side identification apparatus in accordance with the present invention, has an input slot 12 through which a record caddy 14, illustrated in FIG. 2, is inserted for loading an enclosed record into the player. A groove-riding, pickup stylus is mounted in a demountable cartridge which is installed in a compartment provided in a carriage reciprocably mounted in the player. A flap 16 is disposed on the cover section of the player for providing access to the pickup cartridge. The pickup carriage is translated during playback in correlation with the motion of the groove-riding stylus to recover the recorded information from a turntable supported record. A dial 18 is provided on the front instrument panel 20 of the player for indicating playing time. A function selection lever 22 projects through a slot in the instrument panel, and is subject to selective positioning in one of the three positions thereof: OFF, DISC IN/OUT and PLAY. To load a record, the function selection lever is moved to the DISC IN/OUT position, and an occupied caddy is inserted into the player. The enclosed record is then retained in the player when the caddy is withdrawn. To play the retained record, the function selection lever is shifted to the PLAY position. Actuation of a pause button 24 suspends carriage translation and lifts the pickup stylus away from a turntable-supported record. For active scanning of the record, a search button 26 is depressed, and the carriage is translated by means of a thumbwheel 28 while the pickup stylus is in engagement with the turntable-supported record. The carriage can be translated at a speed variable over a range of speeds and in either direction by the thumbwheel.

Figure 3:
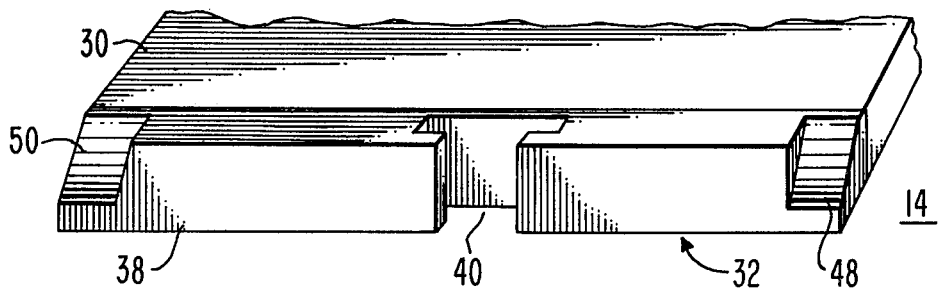
FIG. 3 is an enlarged front view of a portion of the record caddy of FIG. 2.
Figure 4:
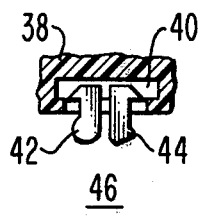
FIGS. 4 and 5 depict the operation of a record extracting mechanism mounted in the player of FIG. 1.

As shown in FIGS. 2 and 3, the record caddy 14 comprises an outer jacket 30 and a record retaining member 32 removably located within the jacket. The retaining member comprises (1) an annular portion 34, that encircles the enclosed record 36, and (2) a spine portion 38, which serves as a closure to keep dust and debris from entering the record enclosing cavity. The spine has an opening 40 into which the latch arms 42 and 44 of a record extracting mechanism 46 (FIGS. 3, 4 and 6) protrude during arrival of a record caddy at a fully inserted position in the player.

As shown more clearly in FIG. 3, the spine 38 is provided with wedge-shaped portions 48 and 50 at each end thereof. The function of the wedge-shaped portions will be described later in conjunction with the description of the operation of the record side identification apparatus of the instant invention.

Figure 6:
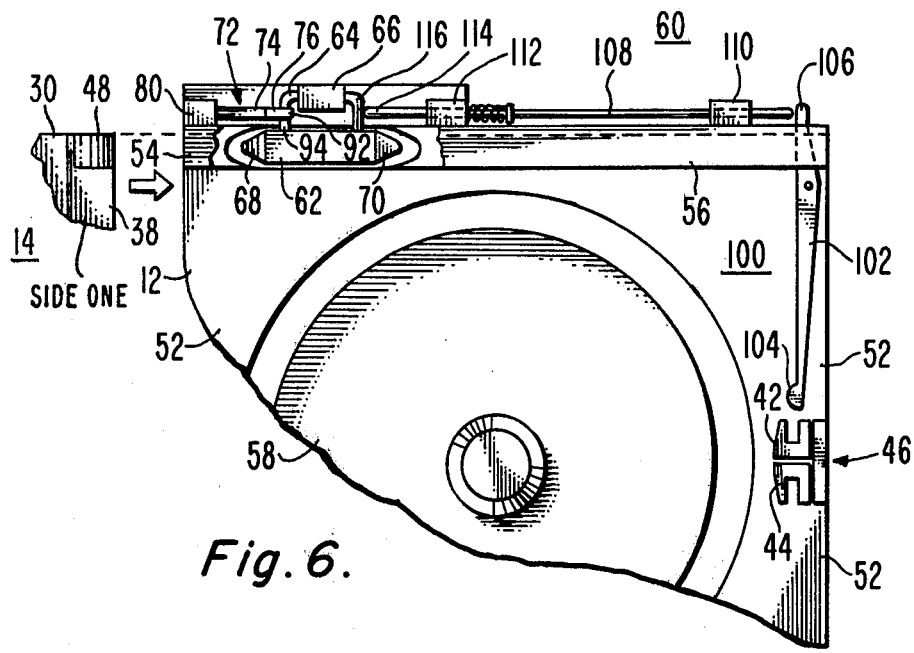
FIG. 6 is a plan view of the record side identification apparatus of FIG. 1.
Figure 7:
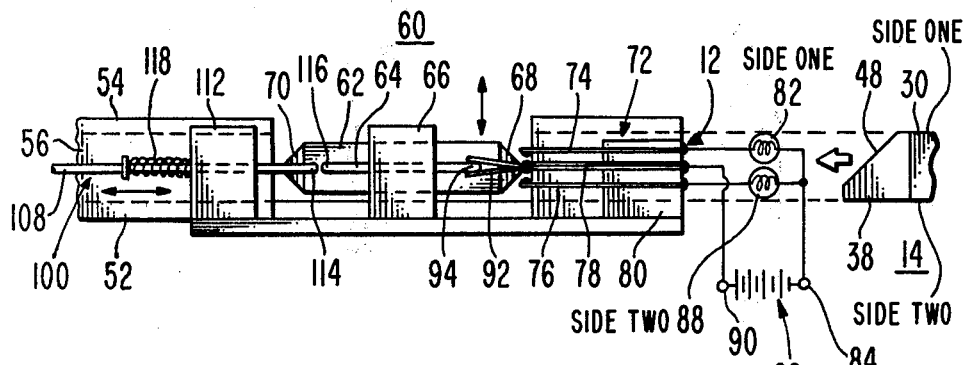
FIG. 7 is a side view of the record side identification apparatus of FIGS. 1 and 6.

A platform 52 (FIGS. 6 and 7), mounted within the player 10 and responsive to the position of the function selection lever, is subject to motion between an elevated position and a depressed position. The DISC IN/OUT position and the PLAY position of the function selection lever, respectively, corresponds to the elevated position and the depressed position of the platform. A pair of rails are mounted on the platform, and are provided with grooves for guiding caddy insertion into the player along a path. Shown in FIGS. 6 and 7 is one of the platform-mounted rails 54 having a caddy guiding groove 56. The front ends of the caddy guiding grooves are aligned with the input slot 21 when the platform is occupying the elevated position for facilitating caddy insertion and extraction.

Figure 5:
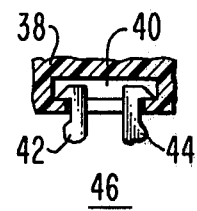

To load a record into the player, the latch arms 42 and 44 are disposed in the closed condition (FIG. 4), the function selection lever is shifted to the DISC IN/OUT position to dispose the platform 52 in the elevated position, and an occupied caddy is inserted through the input slot 12. The latch arms 42 and 44 enter the opening 40 in the spine 38 as the caddy reaches the fully inserted position in the player. The engagement of the caddy with an actuating arm indexes the latch arms into the spread apart condition (FIG. 5), whereby the retaining member and the associated record (i.e., the record assembly) are locked to the platform. Subsequent withdrawal of the caddy removes the record assembly therefrom, thereby retaining the record assembly in the player resting on the raised platform. To transfer the retained record to a turntable 58, rotatably mounted within the player, the platform is lowered to the depressed position.

For record retrieval, the above sequence is reversed. The platform 52, with the record assembly resting thereon, is raised. The platform is provided with a set of depressible lifting pads (not shown) for aligning the record assembly resting thereon with the caddy guiding grooves to cause the return of the record assembly into an empty caddy during insertion thereof into the player. The engagement of the caddy with the actuating arm reindexes the latch arms to the closed condition, thereby freeing the record assembly from the player. Subsequent caddy withdrawal removes the record assembly therewith. It will be noted that throughout the above sequence the retaining member and the associated record always remain together, and that the orientation of one with respect to the other is constant.

In such players, it is desirable that the player be provided with means for identifying the record side subject to playback as soon as the caddy is inserted into the player. Shown in FIGS. 6 and 7 is a record side identification apparatus 60 in accordance with the instant invention. As shown therein, the apparatus includes a sensing member 62 which is fixedly secured to a clasp 64. Th clasp 64 is, in turn, pivotally mounted to a platform-mounted bracket 66. The sensing member 62 tapers to a conical tip 68 at the end thereof adjacent to the input slot 12. When an occupied caddy 14 is inserted into the player with the "SIDE ONE" of the spine 38 facing upward, the wedge-shaped portion 48 of the spine engages the conical tip 68 of the sensing member 62 to cause deflection thereof in the upward direction. On the other hand, the sensing member 62 is displaced in the downward direction, when the caddy is inserted into the player with the "SIDE TWO" of the spine facing upward. For reasons of symmetry, the remote end of the sensing member 62 is provided with a conical tip 70.

An electrical switch 72 comprising a top element 74, a bottom element 76 and a center element 78, is fixedly disposed on a second bracket 80 secured to the platform 52. A light bulb 82, illuminating the "SIDE ONE" indicia on the front instrument panel 29 of the player, is connected in series between the top element 74 and the terminal 84 of a power supply 86. A second light bulb 88, lighting the "SIDE TWO" indicia on the player front instrument panel 20, is interposed between the terminal 84 of the power supply 86 and the bottom element 76. The center element 78 is connected to the other terminal 90 of the power supply 86. The center element 78 has a bifurcated free end 92 which straddles over a portion 94 of the clasp 64. The upward deflection of the sensing member 62 establishes contact between the center element 78 and the top element 74, whereby the "SIDE ONE" light bulb 82 is illuminated. On the other hand, when the caddy 14 is inserted with the "SIDE TWO" of the spine 38 facing upward, the sensing member 62 is deflected downwards illuminating the "SIDE TWO" light bulb 88. Thus, it will be seen that the record side identification is provided as soon as the caddy is inserted into the player for loading a record therein (i.e., before arrival of the caddy at the fully inserted position in the player).

As indicated previously, the retaining member and the associated record (i.e., the record assembly) are retained within the player after an empty jacket 30 is withdrawn from the player. To provide the record side identification throughout the period of retention of the record assembly within the player, the sensing member 62 must be held in the deflected position subsequent to withdrawal of the empty jacket from the player. The sensing member holding mechanism 100 (FIGS. 6 and 7) includes an actuating lever 102 pivotally secured to the platform 52. The actuating lever 102 has one end 104 disposed in the caddy insertion path, and has the other end 106 subject to engagement with a first end of a switch control rod 108. A pair of brackets 110 and 112 support the control rod 108 for translation along a path extending along the axis thereof. A second end 114 of the control rod 108 is disposed adjacent to a portion 116 of the clasp 64 for engagement therewith. The spine 38 pushes the end 104 of the actuating lever 102 away from the center of the turntable during cover arrival at the fully inserted position in the player. The actuating lever 102 is held pivoted by the spine 38 throughout the retention of the record assembly within the player. When the actuating lever 102 is pivoted, the other end 106 thereof displaces the control rod 108 toward the input slot 12.

The second end 114 of the control rod 108 then rides over or under the portion 116 of the clasp depending upon whether the sensing member 62 is deflected downwards or upwards respectively, whereby the sensing member is locked in the position to which it was deflected during insertion of a cover into the player. When the record assembly is retrieved from the player, a coil spring 118 returns the control rod 108 and the actuating lever 102 to their respective home positions.

What is claimed is:

1. In a player for use with a disc record removably subject to occupancy of a protective cover comprising a jacket and a record retaining spine removably located within said jacket; said record being enclosed in said cover such that a first side of said record is associated with a given side of said spine; said player having an input slot through which an occupied cover is inserted to load an enclosed record therein; said player additionally including a record extracting mechanism, located at the end of said player remote from said input slot, for removing said retaining spine from said jacket during jacket withdrawal subsequent to an occupied cover arrival at a fully inserted position in said player, thereby retaining said spine and said associated record in said player; apparatus comprising:
   (A) a sensing member mounted in said player in the vicinity of said input slot such that it is subject to deflection in a first direction and a second direction, opposite to said first direction, in response to engagement with a discontinuity disposed in an occupied cover during insertion thereof in said player with said given side of said spine facing, respectively, upward and downward;
   (B) means responsive to the location of said sensing member for providing an indication of the record side subject to play; and
   (C) means subject to engagement with said spine upon said occupied cover arrival at said fully inserted position in said player for holding said sensing member in the position to which it was deflected during said occupied cover insertion, throughout the period of retention of said spine in said player.

2. An apparatus as defined in claim 1 wherein said deflection of said sensing member is caused by engagement thereof with said spine during said occupied cover insertion into said player.

3. An apparatus as defined in claim 1 wherein said player further includes means, subject to selective alignment with said input slot, for guiding said cover during insertion thereof into said player; said sensing means being movably mounted to said guide means adjacent to the end of said guide means contiguous to said input slot such that said sensing means is disposed in the path of said cover travel in the absence of said deflection of said sensing means.

4. An apparatus as defined in claim 1 wherein said indication providing means includes a common terminal disposed on said sensing member and a pair of spaced terminals; said spaced terminals being located relative to said sensing member such that said common terminal is disconnected from said spaced terminals in the absence of said deflection of said sensing member, and such that said common terminal is connected to one or the other of said spaced terminals depending upon the direction of said deflection of said sensing member.

5. An apparatus as defined in claim 4 wherein said holding means includes a lever movably mounted in said player at said remote end thereof, and subject to displacement in response to engagement with said spine upon said occupied cover arrival at said fully inserted position in said player; said displacement of said lever locking said sensing member into the position to which it was deflected during said occupied cover insertion throughout the period of said spine/lever engagement.

* * * * *